Figure 2:
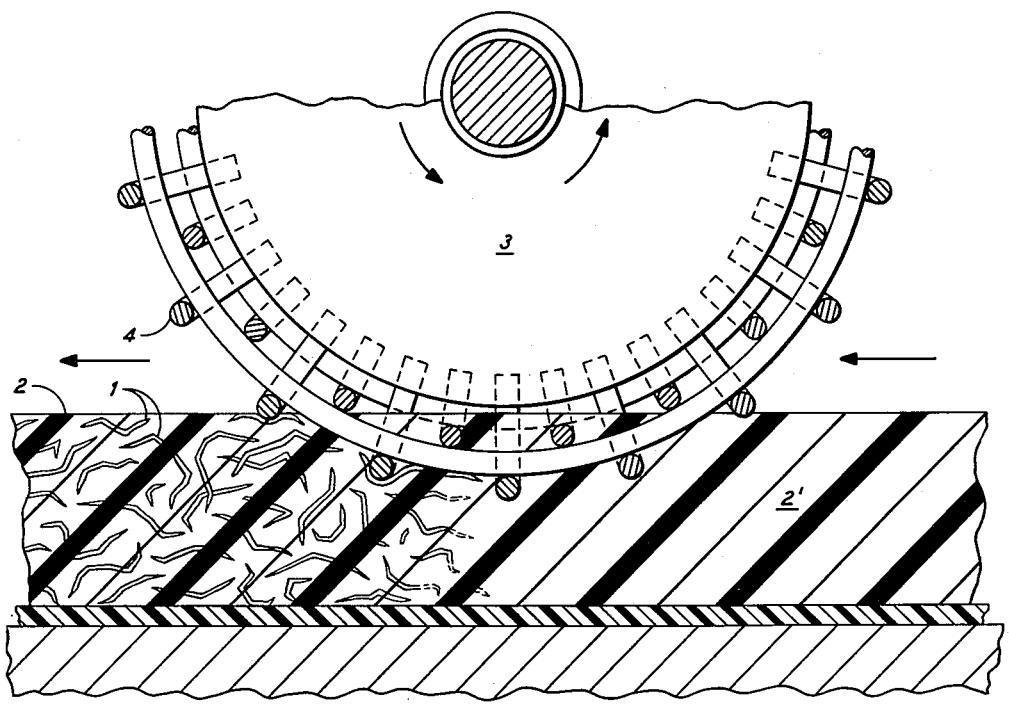

Nov. 21, 1961     K. S. BOYNTON ET AL     3,009,824
PROCESS FOR REINFORCING A FERROUS METAL SURFACE
Filed Aug. 3, 1959

INVENTORS
KINNISON S. BOYNTON
GORDON B. JOHNSON
BILL D. TYREE

BY
ATTORNEYS

3,009,824
PROCESS FOR REINFORCING A FERROUS
METAL SURFACE
Kinnison S. Boynton, Lafayette, Gordon B. Johnson, Berkeley, and Bill D. Tyree, Pleasant Hill, Calif., assignors to California Research Corporation, San Francisco, Calif., a corporation of Delaware
Filed Aug. 3, 1959, Ser. No. 830,996
5 Claims. (Cl. 117—65.2)

This invention relates to a method for reinforcing a ferrous metal surface with a fiber-reinforced plastic lining of corrosion-resistant glass reinforced isophthalic polyester resins. This invention is particularly applicable to the plastic repair of corroded storage tank bottoms, whereby a new resinous bottom is provided for the tank. As an example of the utility of the invention may be mentioned the repair of storage tanks for corrosive petroleum products, such as crude petroleum oil stock, fuel oils, kerosenes and gasolines.

Owing to the inside corrosion caused by the stored liquid and the outside corrosion caused by the electrochemical action of the soil, storage tanks which have been in service for only a few years developed severe leaks. Moreover, the outside corrosion is often such that it brings about structural weakness, including the deterioration of the bottom to the extent that a new bottom has to be installed. One way to tackle this problem in the past has been to jack up the defective tank, slice out the old bottom, and install a new sheet metal bottom. The downtime involved is in the neighborhood of 30 to 90 days depending on the size of the tank, and the cost of materials and labor is very high.

More recently plastic patching compounds have been proposed for the repair of tanks but these have certain deficiencies which render the process less satisfactory. For example, the use of polyesters based on orthophthalic acid results in a lining lacking the desired qualities of adhesion and flexibility. On the other hand, while the epoxy type compounds are satisfactory from the standpoint of adhesiveness, they are expensive and highly toxic.

Broadly, the invention contemplates the lining of a storage tank surface by impelling or projecting against the surface a plurality of short length glass fibers together with or entrained in a blended spray of isophthalic unsaturated polyester containing a curing agent or setting catalyst therefor and of isophthalic polyester containing a promoter or accelerator, whereby the setting and curing of the resin is expedited. Convenient means of operating is the use of commercially available two-headed spray guns, provided with separate feed pots, one for the resin containing promoter and the other for the resin containing catalyst. These guns as shown, for example, in U.S. Patent No. 2,787,314, can also be provided with means for the supply of the glass fibers, i.e., glass roving choppers which cut the roving into the desired lengths, for example, ¼ inch to 2½ inches, the cut fibers being blown into the fan of the atomized blended sprays of the resins. When thus proceeding there is deposited on the surface of fluffy unoriented mass of glass fiber and uncured resin. It is now important to press and work this mass to expel air, push the fibers beneath the surface of the resin and orient them substantially parallel with the surface of the tank being treated. When this operation has properly been performed, the entire mass becomes translucent or transparent and the glass fibers are invisible. This result can be effected by repeatedly pressing the mass with a roller or cylinder provided with a reticulated surface made, for example, from ¼ inch wire cloth or expanded metal lath, the spaces between the wires permitting the unset resin to pass freely in either direction during the pressing operation; desirably the spaces are shorter than the lengths of the glass fibers.

As above indicated, the type of resin employed in the process is critical. In accordance with the invention unsaturated polyesters based on isophthalic acid are used. A convenient method of preparing these resinous materials based on isophthalic acid is described and claimed in copending application Serial No. 458,006, filed September 23, 1954, now U.S. Patent No. 2,904,533. In accordance with this procedure, the isophthalic acid is first reacted with the polyhydric alcohol, e.g., ethylene glycol or propylene glycol, followed by reaction with the unsaturated aliphatic polybasic acid, e.g., maleic.

The unsaturated isophthalic polyester is then admixed with a solubilizing monomer, e.g., styrene, which serves to effect the proper viscosity and later to react with the unsaturated polyester. If the resin is not to be used for some time, a stabilizing agent such as tertiarybutyl catechol or hydroquinone may be added to prevent premature gelatin. A catalyst is used to effect the addition polymerization and produce the insoluble, infusible resin. Suitable catalysts are the hydroperoxide and peroxide initiators, such as benzoyl peroxide, methylethyl ketone peroxide, cyclohexanone peroxide, cumene hydroperoxide, and the like. These can be employed in the customary amounts of 0.5 to 2.0% based on finished resin. In order to supplement catalyst activity, a promoter or accelerator is used along with the catalyst, in amounts of 0.5 to 2.0% based on finished resin. The mol ratio of catalyst to promoter is at least 1:1 and preferably at least 2:1 and higher. Particularly useful as a promoter is cobalt naphthenate (as 6% cobalt solution), used in amounts of 0.01% to 2% by weight based on resin-monomer solution. Various amine compounds, such as 1,2-propylenediamine, dimethylaniline, diethylaniline, N-ethyl-metatoluidine, are also satisfactory.

In the preparation of the resinous compositions of the invention conventional principles are followed. For example, the isophthalic acid is heated with an excess of polyhydric alcohol, for example, propylene glycol, to reaction or condensation temperatures, i.e., to a temperature in which water is expelled from the system, the reaction being continued to a low acid number of the order of 10, and preferably below 5. The reaction is advantageously conducted under an inert atmosphere, for example, nitrogen or carbon dioxide. In the esterification of the isophthalic acid with the polyhydric alcohol, temperatures of the order of 370° F. to 450° F. and reaction times of 6 hours to 8 hours are usual. When the esterification reaction is complete, as evidenced by the cessation of water formation, the unsaturated aliphatic polybasic acid, for example, maleic or fumaric, in an amount of about 0.20 mol to 2 mols per mol isophthalic acid, is added to caused to react with the esterification product of isophthalic acid and polyhydric alcohol. This reaction is also preferably carried out under an inert atmosphere at temperatures usually of the order of 390° F. to 450° F., and for a period of time ranging from about 10 hours to 12 hours. The finished resin, having an acid number below 20 (molecular weight, 2500–3000), is then mixed with the desired proportion of solubilizing monomer, for example, styrene, which later reacts with the unsaturated polyester to produce the insoluble and infusible resin mass.

In the manufacture of the resin, an excess of the polyhydric alcohol over the total acid material, isophthalic and maleic anhydride, is advantageously employed. A 2% to 5% stoichiometric excess of glycol over the acid material is usually satisfactory. As will occur to those skilled in the art the unsaturated polyester can also be modified with other acids, such as succinic and its anhydride, adipic acid, azelaic acid, sebacic acid, etc. Suitable glycols are the mono and polyglycols, such as ethylene glycol, propylene glycol, diethylene glycol, dipropylene glycol, tripropylene glycol, etc. As is known in the art, a small amount of polyhydric alcohols, such as glycerol and pentaerythritol, can be employed in place of the aforementioned glycol.

As a more detailed example of a suitable unsaturated isophthalic polyester and of its prepartion, 1 mol of isophthalic acid (Oronite) is reacted with 2.1 mols of propylene glycol under an inert atmosphere of nitrogen and a temperature of 400° F. in a vessel provided with a steam jacket reflux condenser for the removal of water of condensation. Heating is continued for 6 hours, i.e., until water ceases to be expelled from the reaction zone and the acid number is below 2. There is then added 1 mol of maleic anhydride, the reactants being maintaned under an atmosphere of nitrogen as before. The temperature is maintained at 420° F. for a period of 11 hours. The resin is then mixed with varying portions of styrene, and the color and viscosity determinations performed in accordance with Gardner-Holt methods. The specifications of the resins are as follows:

Acid number _____ 10–15
Color (Gardner-Holt) _____ 3–5
Viscosity (Gardner-Holt):
    30% styrene _____ Z6–Z7
    40% styrene _____ X–Y
    50% styrene _____ I–K
    60% styrene _____ A–B
Gel time (minutes) [1] _____ 5–10

[1] Resins contain 40% styrene, 1% Lupersol DDM, (60% methylethyl ketone peroxide in dimethyl phthalate), 0.6% cobalt naphthenate.

To show the better chemical resistance of resin prepared from isophthalic acid (IPA) as above, mixed with styrene to a viscosity of X–Y Gardner-Holt over resins based on phthalic anhydride (PA), the percent retention of flexural strength of ¼″ x ⅛″ bars of the two resins was determined using an Instron Tensile Tester, the percent flexural strength being obtained by dividing initial flexural strength before contact with the chemical by the strength after the designated time and temperature of contact with the reagent, multiplied by 100.

*Chemical resistance—percent retention of flexural strength*

| Reagent | Time, Weeks | Temp., °F. | IPA Resin, percent | PA Resin, percent |
|---|---|---|---|---|
| Concentrated $H_3PO_4$ | 4 | Room | 97 | 84 |
| 50% $H_2C_2O_4$ | 10½ | do | 91 | 83 |
| 30% $H_2C_2O_4$ | 10½ | do | 83 | 68 |
| 5% $H_2SO_4$ | 18½ | do | 93 | 63 |
| Concentrated $NH_4OH$ | 4 | do | 80 | (¹) |
| Black Liquor From Wood Pulping | 4 | 180° F | 77 | 9 |
| Distilled Water | 4½ | 180° F | 69 | 9 |

¹ Bars cracked and fell apart shortly after removal.

As is known in the art, the viscosity of the resin can be made to vary over a wide range as desired. In general, resins prepared as above described having an acid number below 20, when mixed with 40 to 50%, by weight, of styrene will give viscosities satisfactory for most purposes.

In certain applications, however, it is often advantageous to modify the viscosity of the resin, particularly when it is to be employed to prevent sagging on vertical surfaces and to fill holes. It is often advantageous to apply such modified resin over the rivet lines or seams of tanks. Accordingly, the unsaturated isophthalic polyester is rendered thixotropic in known fashion by the incorporation therein of fillers which improve the handling and flow characteristics. Glass silicates and carbonates have been proposed for this purpose, and expanded silica (Cab—O—Sil) has been found to be particularly effective in amounts of 2 to 10% by weight based on the resin. At the latter concentration the resin has a grease-like consistency.

In a preferred embodiment of the invention the following steps are followed:

(1) The surface to be treated is pretreated to rid it of rust, oil, grease or any foreign matter. This is advantageously accomplished by sandblasting to an oxide-free metal surface. A clean surface is required in order to achieve good adhesion between surface and resin.

(2) To the dry, clean surface is applied a prime coat of unreinforced resin to a thickness of 2–10 mils. This may be accomplished by employing the two-headed spray gun used in the laminating operation below, except that the chopped roving is not applied. This also ensures good adhesion and prevents the formation of an oxide film. Moreover, the prime coat prevents "wicking," that is, conductance of liquid in the tank by capillary action of the glass fibers to the metal surface.

(3) The prime coat is then cured by allowing to stand at ambient temperatures, the time required depending on amount of catalyst. When it is substantially solid, but the surface exhibits slight tackiness, glass fiber, together with the resin, is impelled against the surface, fibers of the length of ½ to 2½ inches in amounts of 15 to 30% by weight of the resin being satisfactory, the thickness of the laminate layer being at least 100 mils, the upper limit not being critical, but is governed by considerations of economics.

(4) The glass laminate layer is then rolled and worked, as hereinabove described, to expel air and depress the cut glass fiber below the surface of the resin.

(5) The glass reinforced laminate is permitted to cure to a point where it is substantially solid and exhibits slight surface tack for good adhesion of the final coat, whereupon a finish coat of unreinforced resin, which may be similar in composition to the prime coat and applied in the same manner, is deposited on the laminate.

(6) Since oxygen prevents or inhibits cure of the resin, the final coat can contain an oxygen-resisting agent to prevent oxygen from inhibiting the final cure. For this purpose, 0.02 to 1% by weight of standard refined wax, melting point range 125–160° F., can be dissolved in the finish coat prior to application. The wax migrates to the surface and prevents oxygen from contacting the mass of resin and thus inhibits cure of the resin.

Figure 1:
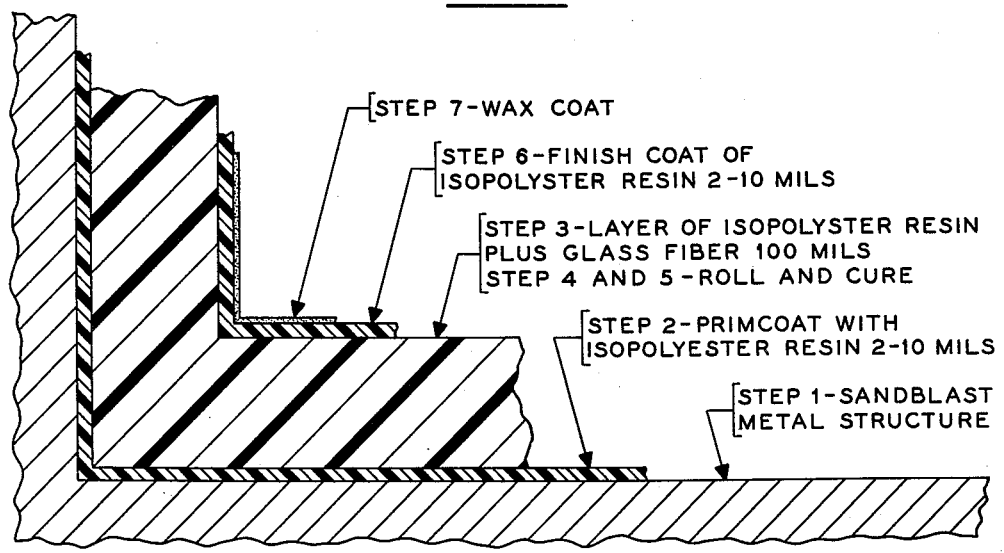

For a quick understanding of the invention, reference is made to the attached drawing, wherein FIGURE 1 illustrates the order of steps involved in the process of the invention by showing the various coats in a sectional drawing; and FIGURE 2, the rolling and working of the resin-glass fiber layer (steps 3–5 of FIGURE 1), numeral 1 indicating unoriented glass fiber; and number 2′ translucent resin after rolling with roller 3 provided with expanded metal lath 4, shown in end view.

As a practical illustration of the use of this invention, a 50-year old riveted steel oil storage tank 115 feet in diameter and 30 feet high, is cleaned and the entire bottom, approximately 13,000 square feet, and lower few feet (approximately 3 feet) of side wall are sandblasted and primed with a thin coat (.002–004″) isopolyester resin in a styrene solution containing 45% styrene, the resin being that described above. The resin contains 1% methylethyl ketone peroxide and 0.6% cobalt naphthenate. The primary purpose of the primer is to prevent the steel from rusting before application of the laminated glass fiber and isopolyester resin layer.

The prime coat is allowed to stand overnight, after which the rivet lines are smoothed over and provided with a continuous surface by the application of resin containing expanded silica in an amount of such that the resin had grease-like consistency without flow. The fiber glass and polyester laminate layer is deposited thereon, by a double-head spray gun provided with a glass roving chopper, similar to the device described in U.S. Patent No. 2,787,314. The isopolyester, similar to that hereinbefore described, in a styrene solution with 45% styrene, contains 1% methylethyl ketone peroxide, and 0.6% cobalt naphthenate so that when mixed in place, the isopolyester hardens in 2-4 hours at normal air temperature. 60 end glass roving is chopped into ½" to 1½" lengths and fed into the resin sprays to give a glass content of about 15 to 30%.

After the mixture just described is applied uniformly to the bottom and a short way up the side wall of the tank to a thickness of from 1/32 to 3/8 inch, it is rolled with reticulated metal rollers about 3-5" in diameter and appropriate length, made of ¼" wire cloth or fine mesh expanded metal lath. This presses the random glass fibers together in planes parallel to the surface being coated, and due to the reticulated structure of the roller, repeatedly presses fibers below the surface of the still-liquid or unset resin, thus removing the air bubbles that otherwise tend to cling to the individual small glass fibers. As a practical test, the rolling operation is terminated when the plastic mass is substantially transparent, i.e., when the individual glass fibers are so thoroughly flattened and wetted with resin that they are not visible.

To give a firm surface to the whole, a very thin spray of the same isopolyester, containing the same catalyst and promoter as used in the preparation of the laminate, and containing 0.3% standard refined wax, melting range 125-135° F., was applied over the laminate after it had dried.

In the example given, the cost of the isopolyester resin laminated glass fiber repair is less than one-third the cost of replacing the tank bottom with steel plate. Some 3,000 pounds of glass roving and 1,200 gallons of isopolyester are employed in the above operation.

We claim:
1. Process for reinforcing a ferrous metal structure, which comprises blasting the metal structure to expose an oxide-free metal surface, promptly covering said surface with a layer having a thickness from about 2 to 10 mils of unsaturated isophthalic polyester resin, curing the film to a point where its body is substantially solid and its surface exhibits slight tackiness, simultaneously spraying a mixture of unsaturated isophthalic polyester and polymerization catalyst, a mixture of unsaturated isophthalic polyester and accelerator, and chopped glass fiber on said film to deposit an unsaturated isophthalic polyester resin-glass fiber layer having a thickness in excess of 100 mils, working said layer to expel air and depress the glass fiber below the surface of the resin.

2. Process for reinforcing a ferrous metal structure, which comprises blasting the metal structure to expose an oxide-free metal surface, promptly covering said surface with a layer having a thickness from about 2 to 10 mils of unsaturated isophthalic polyester resin, curing the film to a point where its body is substantially solid and its surface exhibits slight tackiness, simultaneously spraying a mixture of unsaturated isophthalic polyester and polymerization catalyst, a mixture of unsaturated isophthalic polyester and accelerator, and chopped glass fiber on said film to deposit an unsaturated isophthalic polyester resin-glass fiber layer having a thickness in excess of 100 mils, working said layer to expel air and depress the glass fiber below the surface of the resin, curing said layer to a point where it is substantially solid and exhibits slight surface tack, simultaneously spraying the surface of said layer with a mixture of unsaturated isophthalic polyester and catalyst and with a mixture of unsaturated isophthalic polyester and accelerator.

3. Process for reinforcing a ferrous metal structure, which comprises blasting the metal structure to expose an oxide-free metal surface, promptly covering said surface with a layer having a thickness from about 2 to 10 mils of unsaturated isophthalic polyester resin, curing the film to a point where its body is substantially solid and its surface exhibits slight tackiness, simultaneously spraying a mixture of unsaturated isophthalic polyester and polymerization catalyst, a mixture of unsaturated isophthalic polyester and accelerator, and chopped glass fiber on said film to deposit an unsaturated isophthalic polyester resin-glass fiber layer having a thickness in excess of 100 mils, working said layer to expel air and depress the glass fiber below the surface of the resin, curing said layer to a point where it is substantially solid and exhibits slight surface tack, simultaneously spraying the surface of said layer with a mixture of unsaturated isophthalic polyester and catalyst and with a mixture of unsaturated isophthalic polyester and accelerator, at least one of said mixtures containing 0.02 to 1% of paraffin wax.

4. Process for reinforcing a ferrous metal structure, which comprises blasting the metal structure to expose an oxide-free metal surface, promptly covering said surface with a layer having a thickness from about 2 to 10 mils of unsaturated isophthalic polyester resin, curing the film to a point where its body is substantially solid and its surface exhibits slight tackiness, smoothing out uneven surfaces with a thixotropic resin, simultaneously spraying a mixture of unsaturated isophthalic polyester and polymerization catalyst, a mixture of unsaturated isophthalic polyester and accelerator, and chopped glass fiber on said film to deposit an unsaturated isophthalic polyester resin-glass fiber layer having a thickness in excess of 100 mils, working said layer to expel air and depress the glass fiber below the surface of the resin, curing said layer to a point where it is substantially solid and exhibits slight surface tack, simultaneously spraying the surface of said layer with a mixture of unsaturate disophthalic polyester and catalyst and with a mixture of unsaturated isophthalic polyester and accelerator, at least one of said mixtures containing 0.02 to 1% of paraffin wax.

5. Process for reinforcing a ferrous metal structure, which comprises blasting the metal structure to expose an oxide-free metal surface, promptly covering said surface with a layer having a thickness from about 2 to 10 mils of unsaturated isophthalic polyester resin, curing the film to a point where its body is substantially solid and its surface exhibits slight tackiness, simultaneously spraying a mixture of unsaturated isophthalic polyester and polymerization catalyst, a mixture of unsaturated isophthalic polyester and accelerator, and chopped glass fiber on said film to deposit an unsaturated isophthalic polyester resin-glass fiber layer having a thickness in excess of 100 mils, pressing said layer with a reticulated roller, the unset resin being unrestrained to pass through the spaces in said reticulated roller, to expel air and depress the glass fiber below the surface of the resin, curing said layer to a point where it is substantially solid and exhibits slight surface tack, simultaneously spraying the surface of said layer with a mixture of unsaturated isophthalic polyester and catalyst and with a mixture of unsaturated isophthalic polyester and accelerator, at least one of said mixtures containing 0.02 to 1% of paraffin wax.

References Cited in the file of this patent

UNITED STATES PATENTS

| | | |
|---|---|---|
| 2,735,199 | Victor | July 3, 1956 |
| 2,786,007 | Chew | Mar. 19, 1957 |
| 2,787,314 | Anderson | Apr. 2, 1957 |
| 2,850,421 | Thompson | Sept. 2, 1958 |
| 2,927,867 | Hings | Mar. 8, 1960 |
| 2,930,106 | Wrotnowski | Mar. 29, 1960 |